Figure 1:
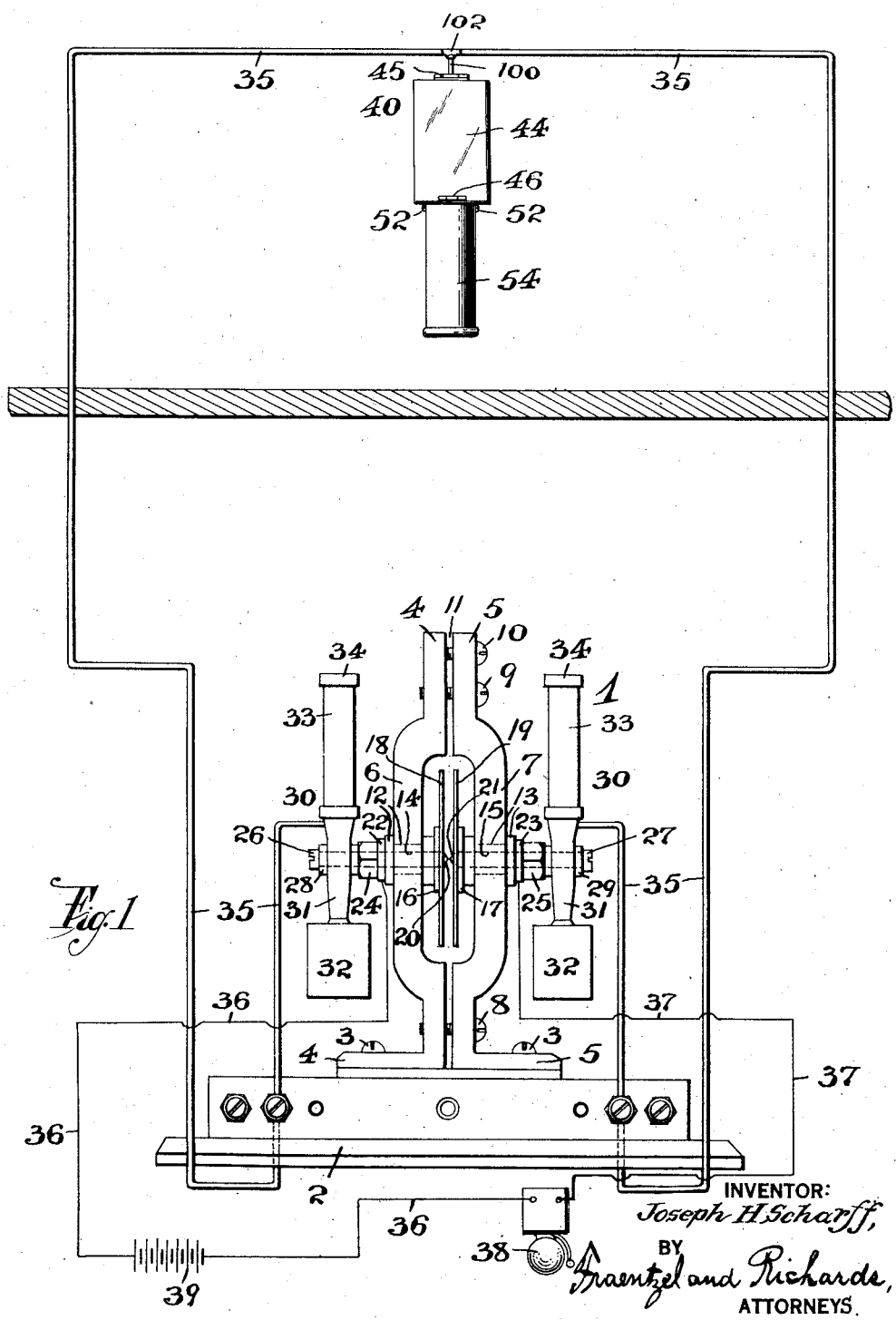

June 20, 1933. J. H. SCHARFF 1,915,263
SIGNALING SYSTEM AND APPARATUS THEREFOR
Original Filed Aug. 9, 1923 3 Sheets-Sheet 1

INVENTOR:
Joseph H. Scharff,
BY
Fraentzel and Richards,
ATTORNEYS.

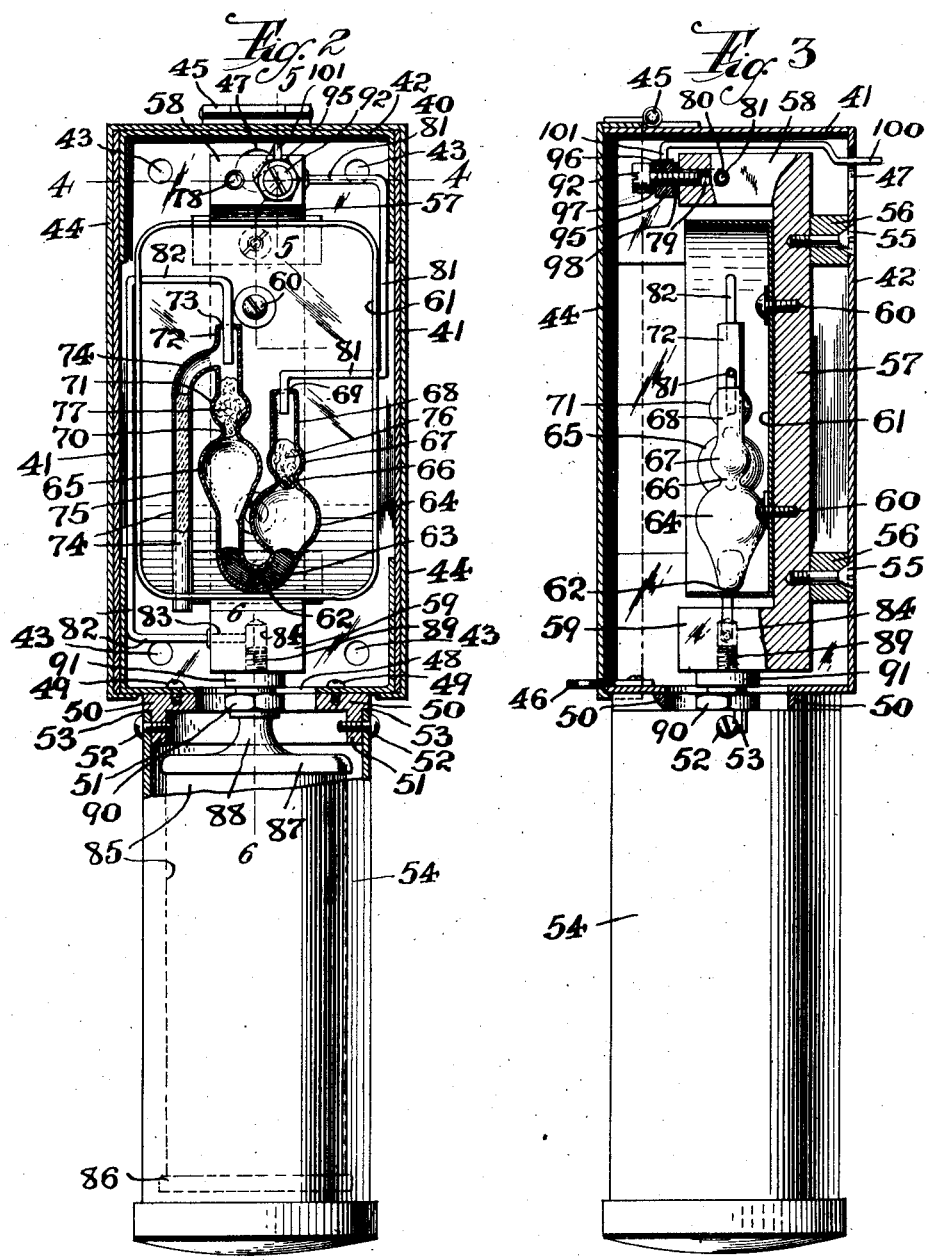

June 20, 1933.  J. H. SCHARFF  1,915,263
SIGNALING SYSTEM AND APPARATUS THEREFOR
Original Filed Aug. 9, 1923  3 Sheets-Sheet 3
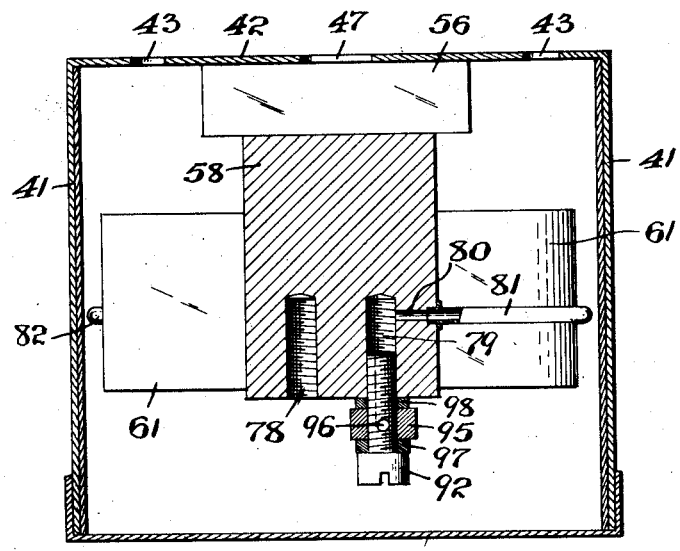
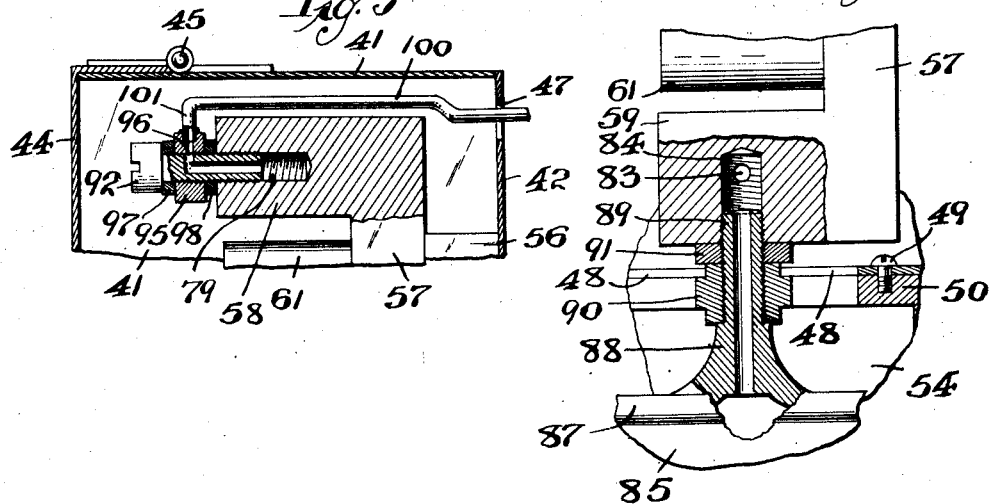
INVENTOR:
Joseph H. Scharff,
BY
Graentzel and Richards,
ATTORNEYS Patented June 20, 1933

1,915,263

UNITED STATES PATENT OFFICE

JOSEPH H. SCHARFF, OF NUTLEY, NEW JERSEY, ASSIGNOR TO JOHN C. LITT, OF MANHASSET, NEW YORK, PERCIVAL W. COWLES, OF SCARSDALE, NEW YORK, AND AUTOMATIC FIRE ALARM COMPANY, OF NEW YORK, N. Y., A CORPORATION OF NEW YORK

SIGNALING SYSTEM AND APPARATUS THEREFOR

Application filed August 9, 1923, Serial No. 656,527. Renewed November 6, 1930.

This invention relates, generally, to improvements in fire-alarms or indicators; and especially to that class of fire-alarm systems consisting of one or more circuits of tubing, usually of copper, which are run through a protected area upon or near the ceilings or side-walls thereof, such tubing containing air which is normally at atmospheric pressure, but which is expanded under the influence of heat, which produces excessive pressure so as to cause a pneumatically actuated detector-device to establish an electrical circuit for the purposes of sending in an alarm or fire-signal.

Such a system is shown in my prior Patent No. 1,520,145 of December 23, 1924, the present invention contemplating, in certain aspects improvements in the system and apparatus described and claimed in such prior patent.

Specifically stated, it is an object of the invention to provide, in a system of this character, an improved breather control in which no accidental stoppage will occur.

A further object of the invention is that of furnishing a testing device or unit which will be functionally and structurally improved, and which may form a permanent part of the system, this unit being capable of use in various different associations, but being particularly intended to be employed in a system such as has been illustrated in my prior patent.

A still further object is that of furnishing a device of this type which may be operated at will to efficiently test the system and apparatus with which it is in association, and by means of which exactly those conditions under which such system and apparatus should function will be duplicated.

Another object is that of furnishing a structure of this nature which will embody relatively few parts capable of ready assemblage and providing a rugged apparatus operable for long periods of time without the necessity of replacement or without danger of mechanical defects occurring.

With these and further objects in mind, reference is had to the attached sheets of drawings illustrating one practical embodiment of the invention, and in which:

Fig. 1 is a somewhat diagrammatic representation of a system and apparatus such as has been shown in my previous patent, and illustrating a testing device in association therewith;

Figs. 2 and 3 are partly sectional front and side views of the testing device or unit; and Figs. 4, 5 and 6 are sectional views taken along the lines 4—4, 5—5, and 6—6 respectively of Fig. 2.

With primary reference to the system in connection with which the present invention may be employed, it will be observed that the numeral 1 indicates generally detector and shock compensating apparatus such as has been described and shown in my prior patent. This apparatus comprises a suitable base or support, as 2, upon which are mounted and secured thereon, by means of screws 3, or other suitable fastening means, a pair of standards or frame-members 4 and 5, preferably provided with oppositely located and outwardly bowed bearing-portions, as 6 and 7. The said standards or frame-members 4 and 5 are usually connected by means of suitably disposed screws 8, 9 and 10 for compensating and regulating to any desired degree the space 11 between said members. The said members 4 and 5 are provided with oppositely located bearing-portions in which are disposed suitably formed sleeves 12 and 13, made of insulating material, and disposed in the respective insulators or sleeves 12 and 13 are tube-like elements 14 and 15, as indicated in dotted lines in Figure 1 of the drawings, the said elements 14 and 15 being respectively provided with discs 16 and 17.

The discs 16 and 17 carry diaphragms 18 and 19 of any convenient construction, which are provided with oppositely located contacts 20 and 21. The outer end-portions of the tube-like elements 14 and 15 extend from the respective insulators 12, and mount washers or discs 22 and 23, and the tightening nuts 24 and 25 for securing the various parts in their assembled relation. Extending into the tubular elements 14—15 and beyond the nuts 24—25 are the channelled shanks of a pair of screws 26 and 27. Suitably disposed one upon each screw are a pair of insulating sleeves, as 28 and 29, which in turn mount and have their interiors in communication with equalizing chambers 30. Each chamber 30 comprises a main tubular body 31 with the lower end-portion of which may be suitably connected a chambered device, as 32, provided with a hygroscopic material. Suitably connected and in communication with the upper end-portion of said tubular body 31 is a shock-absorbing compensating or equalizing chamber 33, the upper end-portion of which is closed by means of a cap 34. Connected so as to be in communication with the interior of said tubular bodies 31 and the said chambers 33, are the respective ends of a pneumatic tubing 35 of a fire-alarm system or temperature indicator.

As shown in said Figure 1, there is electrically connected with the complete detector-device 1, by means of circuit-wires 36 and 37, an alarm-indicator, as 38, electric current being supplied by means of a source of electrical energy as a battery 39, and the circuit being closed when electrical contact is made by the contact-points 20 and 21, of the respective diaphragms 18 and 19, when they become active due to an expansion of the air to the desired degree in the tubing 35.

The foregoing construction has been described in detail in my patent previously referred to. Generally stated, the present invention is not directed to this apparatus except with certain exceptions hereinafter made, and it will be apparent that the construction of this apparatus and system may be varied in numerous respects, the present invention being capable of use in numerous different associations.

In order that the herein-above described fire-alarm system upon installation may be thoroughly tested and actuated identically in the same manner as the system would be called upon to function under actual fire-conditions, I have arranged in the pneumatic tubing or air-line 35, a test-device of the general construction shown in Figures 2 and 3 of the drawings, this device being arranged in any portion of the tubing or air-line 35, preferably to form a permanent part thereof, that tests may be made as often as desired, and that no replacements or adjustments of the various devices, or of any parts thereof, are necessary after a test has been made.

Referring now more particularly to these figures, the reference-character 40 indicates a complete test-device made according to and embodying the principles of the present invention, and comprises a main casing 41 provided in its rear wall 42 with screw-receiving holes or perforations, as 43, for securing said casing to a wall or other suitable part of a room, or the like. The open front portion of said casing is adapted to be closed by means of a cover 44, which is hinged to said casing 41, as at 45, or may be otherwise operatively connected with said casing, the said parts being preferably provided with a lock-receiving means, as 46, or other suitable means, for maintaining a closed relation between the said casing and its cover, as will be evident. In its rear wall 42 the casing is made with an opening 47 and in its lower wall with an opening 48, the purpose of which will be presently more fully described. Suitably secured to the outer surface of the lower wall as for example by means of screws 49, is a ring 50 which is provided with a downwardly projecting annular flange 51. This flange is provided with laterally extending pins or screws 52, for detachably securing, by means of bayonet-slots 53, the open end-portion of a chambered member or cup, as 54. Suitably secured within the main casing 41, by means of screws 55, upon for example, supporting blocks 56, is a frame or plate 57, which is provided at its upper end with a forwardly projecting member or post 58, and its lower end with a similar forwardly projecting member or post 59. Disposed between the portions 58 and 59 is a shell 61 in which there is arranged, in the present exemplification, a mercury valve. This device is preferably made of glass, and includes in the embodiment shown a U-shaped portion 62, in which is disposed under normal conditions a quantity of mercury 63. The arms of the U-shaped portion 62 have enlargements 64 and 65, providing suitable receiving chambers. The enlargement 64 terminates in a neck 66 beyond which a second enlargement or bulb 67 is provided, the arm 68 having a cylindrical portion, the end of which is provided with an opening 69. Likewise, the arm 70 has enlargements 65 and 71 between which a neck 70 is provided, the end of this arm being furthermore formed with an opening 73. In communication with and extending downwardly from the arms 72, to a point preferably outside of the shell 61 is a tubular member, as 74, filled with a porous material 75, as plaster of paris, or the like, substantially as shown in Figure 2 of the drawings. The enlargements or bulbs 67 and 71 are respectively filled with quantities of cotton, as 76 and 77, or other suitable material, the purpose being to prevent the mercury at any time entering the arms 68 and 72. The post 58 is provided with a pair of internally screw-threaded duct-portions 78 and 79, (see Fig. 4), the former being a blind portion for a purpose hereinafter stated, and the latter communicating with a passage 80 connected to a tube 81 which extends through the shell 61 and has its end passing through the opening 69. Leading from the opening 73 of the arm 72 there is a tube 82 which is connected with a duct 83 in the side of the lower post 59, and which connects with a vertically disposed and internally screw-threaded receiving recess or duct-portion 84. The reference-character 85 indicates a hollow body, providing an air-receiving expansion chamber, which is closed at its lower and upper ends, as at 86 and 87, and is disposed within the cup 54, and the closure or cap 87 being provided with a tubular neck or reduced portion, as 88, (see Fig. 6) which extends in an upward direction through the ring 50 and the opening 48 in the lower wall of the said main casing 41, the said tubular portion or neck 88 also having extending therefrom an externally screw-threaded and longitudinally perforated stud, 89, which is screwed into the internally screw-threaded receiving recess or duct-portion 84. To produce a leak-proof connection, and securely fix the parts in this assembled relation, the neck-portion may be provided with a wrench-receiving portion, as 90, and upon the stud 89 I may place a washer 91, usually of lead.

Screwed into the previously mentioned internally screw-threaded recess or duct-portion 79 of the post 58 is a stud 92, see Fig. 5, provided in its shank with a longitudinal duct and a laterally extending opening communicating with a duct-portion 96 formed in a washer 95, which is preferably of lead, is disposed upon the stud shank between a pair of other washers, as 97 and 98. Suitably connected with the duct 96 is the end 101 of a tube 100 which extends through the opening 47 in the main casing, and is connected with the main line 35 as at 102.

At this time it will also be observed that preferably, as shown, the bulb portion 64 is provided substantially adjacent the base of the arm of which it forms a part, and flares materially while the bulb portion 65 is spaced from the base of the arm 72,—flares to comparatively a small extent—and is located in a plane somewhat above that in which the bulb 64 is disposed. As a consequence, it will be appreciated that the mercury valve will act to exert a comparatively slight amount of resistance to the flow of air from the arm 72 to the arm 68, but this element, while permitting air flow in a reverse direction, will offer comparatively high resistance thereto. More particularly, it will be patent that the mercury, in moving into the bulb portion 64, will define a column of relatively minimum height and the body of mercury will be relatively thin, permitting air to force through. While the column defined within the arm 72— when the mercury moves into this arm—is relatively high and when the mercury finally spreads into the bulb portion 65, the layer thereof is comparatively heavy or thick to produce the result desired.

To make a test, the cup 54 is removed from the testing device and filled with hot water of the degree of heat desired and is thereupon returned to its former position, about the chambered body 85, so that the latter is immersed in the hot water. Immediately, the air within said body 85 is expanded, causing a corresponding expansion of the air through the neck 88, the tubular stud 89, the ducts 84 and 83, the tubing 82, the portions 72, 71 and 65 of the mercury valve, the valve performing no other function than that of a valve which permits the expanded air in the testing bulb to pass into the main system displacing the mercury in the portion 62 in such a manner, that it will pass into the bulb or member 64. The air within the members 64, 67 and 68 is thereupon compressed and continues to be forced into and through the tube 81, through the duct-portions 80 and 79, the tubular stud 92 and the duct 96 in the washer 95, through the tubing 100, and the main air-line tubing 35 to the diaphragms of the detector-device, which cause the proper contact to be made, so that a complete electrical circuit is established, the fact of which will be communicated by the alarm-device, as will be clearly evident. As the heated medium within the chambered member or cup 54 cools off sufficiently, the mercury 63 drops back into its normal position in the part 62 of the mercury valve, the main system being ready to function under actual fire-conditions. It will be understood that a considerable vacuum is formed in the testing bulb after heat has been applied thereto to drive the expanded air out of the same into the tube line. When the testing bulb cools off, a certain amount of relief is given to this vacuum by the mercury 63 yielding to the overbalancing pressure in the tube line, whereby said mercury moves upward into the enlarged duct or bulb 65 to permit some air to flow back through the mercury valve into the testing bulb. However, the nature of this valve is such that the vacuum is not completely taken care of by this means, and to provide for complete compensation, there is a slow leak provided in the duct 74 through the porous material 75. The slow leak-device provided by the tubular member 74 and its porous filler 75 therein, during the testing operation, thus prevents any improper functioning of the test-device; and, furthermore, upon cooling of the device prevents a vacuum within the chambered body 85, owing to the fact that the outside air will enter the tubular member 74, percolating through the filler 75 therein, and will enter by means of the member 72, the tubing 82, the duct-portions 83 and 84, the tubular stud 89 and the neck 88, into the chambered body 85, whereby the latter becomes gradually filled with a fresh supply of air, so that the testing device is ready for the next testing operation.

The mercury tube or valve is arranged so that as a pressure is produced in the air chamber of the testing device, air under pressure will flow through and pass the mercury trap 62. The air will then proceed through the system and by its passage through the tube line 35, will effect the closing of the electrical circuit. This action is apparent from a perusal of Fig. 2. Tube 82 has access to the chamber 85 and since the material 75 in tube 74 is of comparatively great resistance, the air will go through tube 65, and the mercury, and hence build up a pressure in tube 35. However, assuming a pressure were built up in tube 35 due to a rise in temperature of the surrounding atmosphere, as would be the case if fire broke out. The pressure in tube 35 would immediately serve to set off the alarm without waiting for pressure to build up in the testing device. And this is due to the structure of the mercury valve. Chamber 64 and its outlet are respectively at lower levels than chamber 65 and its outlet. Thus, upon the building up of pressure in the tube line 35, it cannot escape through this mercury valve due to the long lift of mercury to be overcome. Before such lift can be overcome, the alarm will have been operated. Thus, it is apparent that while the device is adapted to readily transmit a pressure in one direction, it will not do so in the other direction. This construction thus constitutes the valve as a seal for all practical purposes. In practice, the chamber 85 may be removed, inasmuch as its function is merely to provide a receptacle wherein air may be expanded by heat to produce a pressure for testing purposes.

With regard to the parts 74—75, it will be noted that the tube and porous matter therein are of the greatest utility. The compensating chambers or equalizing chambers 33 have a mathematical relationship to the capacity of the tube line. The size of these chambers may be changes where extreme heat conditions are involved to get a desired air volume in proper mathematical relationship to the volume in tube 35. This, however, has no bearing on the necessity or utility of tube 74. And this is the reason. When the heat element is removed from the chamber, it cools off and the air therein contracts and forms a partial vacuum. This vacuum is apt to produce a vacuum pressure considerably in excess of the pressure which is necessary to actuate the system. It is, therefore, necessary that the testing chamber shall be returned to its normal condition before another test can be made. This is accomplished in two ways. First, by the mercury being drawn up into that portion of the mercury valve which acts as a relief to the vacuum pressure. However, after the vacuum pressure has been equalized with the existing pressure in the valve, a considerable vacuum is still left in the test chamber which is hard to overcome because of the heavy weight of mercury still holding against it. Thus, to completely overcome all vacuum pressure in the testing chamber, it is necessary to supply some other means than the mercury valve for admitting the necessary air to completely clear the vacuum. Applicant therefore employs a second means comprising tube 74. This vent contains porous matter so that the intake of air is so slow as to have no practical effect on the testing chamber during a test, but is of sufficient capacity to allow the pressure in the testing chamber to become absolutely normal after a test is completed.

From the foregoing description, it will be clearly evident, that a simply constructed and an effectively operating device has been produced, which is readily connected with the pneumatic tubing of a fire-alarm system, whereby the system may be thoroughly tested, and actuated identically the way it would be called upon to function under actual fire-conditions.

Furthermore, when the device 40 is not in use for testing purposes, the outer chambered member or cup 54 acts as an insulator for the chambered body 85, so that the air therein will not become materially affected by excessive or abnormal heat-conditions which might interfere with the proper functioning of the main fire-alarm system. When it is desired to test the air-carrying pressure of the main air-line 35 by applying air-pressure to said line by means of the usual force-pump, the testing device is readily disconnected from communication with the main line, by unscrewing the stud 92 from the duct-portion 79, with the members 95, 97 and 98 left remaining upon said stud, the stud being screwed into the blind duct or recessed portion 78 of the post 58, whereby the testing device is cut out from communication with the main air-line 35, as will be clearly evident.

It is obvious that the construction of the parts may be changed in numerous respects, that they may be rearranged according to the peculiarities of the installation of which a device constructed within the terms of the present invention forms a part, and that the individual features of the apparatus herein described may be employed as desired without departing from the spirit of my invention as defined by the claims.

I claim:

1. A testing device for fire-alarm systems, or the like, comprising a casing, a mercury valve within said casing, an air-receiving chamber connected with said casing, a tubular means for conducting expanded air from said air-receiving chamber to said mercury valve to actuate said valve, tubular means connected with said valve for conducting the air from said valve when the latter is actuated, a cup encompassing said air-receiving chamber, said cup being adapted to receive a heating medium, and means connected with said casing and said cup, for detachably securing said cup to said casing and about said air-receiving chamber.

2. A testing device for fire-alarm systems, or the like, comprising a casing, a mercury valve within said casing, an air-receiving chamber connected with said casing, a tubular means for conducting expanded air from said air-receiving chamber to said mercury valve to actuate said valve, tubular means connected with said valve for conducting the air from said valve when the latter is actuated, a tubular air-intake connected with said mercury valve for conveying air to said air-receiving chamber, a cup encompassing said air-receiving chamber, said cup being adapted to receive a heating medium, and means connected with said casing and said cup, for detachably securing said cup to said casing and about said air-receiving chamber.

3. A testing device for fire-alarm systems, or the like, comprising a casing, a mercury valve within said casing consisting of a U-shaped portion adapted to contain mercury, enlarged bulb-shaped members at the ends of said U-shaped portion, a smaller bulb-shaped member connected with each enlarged bulb-shaped member, an air-receiving chamber connected with said casing, a tubular air-conducting means between said chamber and one of said smaller bulb-shaped members, and a tubular air-conducting means connected with and leading from the other smaller bulb-shaped member, a cup encompassing said air-receiving chamber, said cup being adapted to receive a heating medium, and means connected with said casing and said cup, for detachably securing said cup to said casing and about said air-receiving chamber.

4. A testing device for fire-alarm systems, or the like, comprising a casing, a mercury valve within said casing consisting of a U-shaped portion adapted to contain mercury, enlarged bulb-shaped members at the ends of said U-shaped portion, a smaller bulb-shaped member connected with each enlarged bulb-shaped member, an air-receiving chamber connected with said casing, a tubular air-conducting means between said chamber and one of said smaller bulb-shaped members, and a tubular air-conducting means connected with and leading from the other smaller bulb-shaped member, a tubular air-intake connected with said mercury valve for conveying air to said air-receiving chamber, a cup encompassing said air-receiving chamber, said cup being adapted to receive a heating medium, and means connected with said casing and said cup, for detachably securing said cup to said casing and about said air-receiving chamber.

In testimony, that I claim the invention set forth above I have hereunto set my hand this 8th day of August, 1923.

JOSEPH H. SCHARFF.